US011677316B2

(12) United States Patent
Messina et al.

(10) Patent No.: US 11,677,316 B2
(45) Date of Patent: Jun. 13, 2023

(54) METHOD TO CONTROL A VARIABLE FREQUENCY SWITCHING CONVERTER, AND CORRESPONDING VARIABLE FREQUENCY CONVERTER APPARATUS

(71) Applicant: STMicroelectronics S.r.l., Agrate Brianza (IT)

(72) Inventors: Sebastiano Messina, Mascalucia (IT); Marco Torrisi, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 122 days.

(21) Appl. No.: 17/218,916

(22) Filed: Mar. 31, 2021

(65) Prior Publication Data

US 2021/0313875 A1 Oct. 7, 2021

(30) Foreign Application Priority Data

Apr. 2, 2020 (IT) .................. 102020000006976

(51) Int. Cl.
*H02M 1/44* (2007.01)
*H02M 1/42* (2007.01)

(52) U.S. Cl.
CPC ........... *H02M 1/44* (2013.01); *H02M 1/4208* (2013.01)

(58) Field of Classification Search
CPC .............................. H02M 1/4208; H02M 1/44
See application file for complete search history.

(56) References Cited

U.S. PATENT DOCUMENTS

| 10,439,489 | B1* | 10/2019 | Tsai ..................... H02M 1/4225 |
| 2009/0147547 | A1 | 6/2009 | Yamashita |
| 2011/0228572 | A1* | 9/2011 | Lin ........................ H03K 3/027 331/34 |

(Continued)

FOREIGN PATENT DOCUMENTS

EP 0386980 A2 9/1990

OTHER PUBLICATIONS

Aurasopon A et al: "The Variable Hysteresis Band in a Delta-Sigma Modulation", IEICE Transactions on Fundamentals of Electronics, Engineering Sciences Society, Tokyo, JP, vol. E87-A, No. 9, Sep. 1, 2004 (Sep. 1, 2004), pp. 2248-2255, XP001209327.

(Continued)

*Primary Examiner* — Kyle J Moody
*Assistant Examiner* — Lakaisha Jackson
(74) *Attorney, Agent, or Firm* — Crowe & Dunlevy (57) ABSTRACT

A variable duty cycle switching signal at a switching frequency is applied to a switching current regulation circuit arrangement energizing a current storage circuit assembly. Switching of the variable duty cycle switching signal is controlled by an upper and a lower threshold current level. The upper and lower threshold current levels vary with time following an average current value time variation. Additionally, frequency jitter is introduced in the variable duty cycle switching signal by: defining at least a frequency modulation window around a limit frequency identifying a limit value for an acceptable EMI; and applying an amplitude modulation of the upper and/or lower threshold current levels varying with time, wherein the amplitude modulation is applied in a time interval between times when the switching frequency enters and exit the frequency window.

21 Claims, 7 Drawing Sheets

(56) References Cited

U.S. PATENT DOCUMENTS

| | | |
|---|---|---|
| 2014/0085936 A1 | 3/2014 | Jin et al. |
| 2015/0318780 A1 | 11/2015 | Davila |
| 2019/0199203 A1* | 6/2019 | Viswanathan .......... H02M 7/06 |
| 2020/0007031 A1* | 1/2020 | Xiang ................. H02M 1/4233 |

OTHER PUBLICATIONS

Noguchi T et al: "Performance improvement of current-controlled PWM inverter by means of dithering", Power Electronics and Drive Systems, 2001. Proceedings., 2001 4th IEEE International Conference on, Piscataway, NJ, USA, IEEE, vol. 1, Oct. 22, 2001 (Oct. 22, 2001), pp. 390-395, XP010571556.

Rosetto L et al: "Control Techniques for Power Factor Correction Converters", Proceedings of PEMC 1994,, Jan. 1, 1994 (Jan. 1, 1994), pp. 1310-1318, XP007920948.

Shahzad M Imran et al: "Design of a PEV battery charger with high power factor using half-bridge LLC-SRC operating at resonance frequency", 2015 IEEE International Conference on Control System, Computing and Engineering (ICCSCE), IEEE, Nov. 27, 2015 (Nov. 27, 2015), pp. 424-429, XP032906023.

Zare F et al: "A new Random Current Control Technique for a Single-Phase Inverter with Bipolar and Unipolar Modulations", Fourth Power Conversion Conference, Apr. 2-5, 2007, Nagoya, Japan, IEEE, Piscataway, NJ, USA, Apr. 1, 2007 (Apr. 1, 2007), pp. 149-156, XP031178461.

IT Search Report and Written Opinion for IT Appl. No. 102020000006976 dated Dec. 1, 2020 (12 pages).

* cited by examiner

METHOD TO CONTROL A VARIABLE FREQUENCY SWITCHING CONVERTER, AND CORRESPONDING VARIABLE FREQUENCY CONVERTER APPARATUS

PRIORITY CLAIM

This application claims the priority benefit of Italian Application for Patent No. 102020000006976, filed on Apr. 2, 2020, the content of which is hereby incorporated by reference in its entirety to the maximum extent allowable by law.

TECHNICAL FIELD

The embodiments of the present disclosure refer to a power supply working at variable frequency and, in particular, to techniques to reduce peak EMI in a variable frequency switching converter.

Embodiments include introducing a jitter signal through the control unit applying the switching signals to the switching devices of said converter, an upper and a lower threshold current being defined as the switching point of the switching devices so that the switching frequency is proportional to the inverse of difference between the thresholds, said upper and lower threshold current varying with time following the average current value time variation.

BACKGROUND

Switching power converters are widely used in the power conversion field thanks to their high efficiency, small dimensions and light weight. They can be found in battery chargers, mobile electronic products, and power supplies for industrial home appliance, automotive, telecom, servers, and other applications.

EMI (Electro Magnetic Interference) is becoming a very important aspect which has to be considered in designing an electronic system.

Switching power converters can be classified in two types: Fixed Frequency Converters and Variable Frequency Converters.

For both the types of converters, the EMI behavior is an important aspect that has to be taken in consideration.

An approach that has been used to reduce the EMI pollution is to insert an EMI filter in the input stage. For this reason, the EMI peak value must be decreased in order to reduce, at minimum, the size of the EMI filter or, if possible, to eliminate it totally.

An approach that has been used to reduce the EMI peak values is to insert a frequency jitter: generally this jitter comprises a modulation of the switching frequency value with a defined amplitude and rate.

In a constant frequency power converter, once the operating switching frequency is set, it is easy to choose the frequency rate and the amplitude of the frequency jitter in order to reduce the EMI peak value.

In a variable frequency power converter, however, in which the operating frequency of the variable frequency converter is determined by an input-output state thereof, the frequency will change continuously thus changing input and output conditions (e.g., voltage/current). For this reason it is very complicated to add the frequency jitter without perturbing the control circuit. Some examples of a variable frequency power converter can be converters with hysteresis control, bridgeless totem pole PFC (Power Factor Correction) with Triangular Current Mode (TCM) operation, and so on. The variable frequency converters are usually preferred for their very high efficiency, but from an EMI point of view they are more difficult than constant frequency converters.

United States Patent Application Publication No. 2014/0085936A1, incorporated by reference, is an example of an approach that has been used to introduce the frequency jitter in variable frequency converter.

Considering the foregoing, there is a need in the art to provide a more efficient variable frequency electronic converter, where EMI is reduced without adding external circuits and with no perturbation in the control unit.

SUMMARY

According to one or more embodiments, a method is presented to control a variable frequency converter apparatus operating with variable frequency.

The method comprises: applying a variable duty cycle switching signal at a switching frequency to a switching current regulation circuit arrangement energizing a current storage circuit assembly (in particular an inductor); wherein applying the variable duty cycle switching signal includes defining an upper threshold current level and a lower threshold current level; performing a switching in response to reaching said current levels so that said switching frequency is proportional to an inverse of a difference between said upper and lower threshold current levels, said upper and lower threshold current levels varying with time following an average current value time variation; introducing a frequency jitter in the variable duty cycle switching signal; defining a frequency modulation window around a limit frequency identifying a limit value for accepted EMI; applying an amplitude modulation of said upper and/or lower threshold current levels varying with time, said amplitude modulation being applied in a time interval between times when the switching frequency enters and exits said frequency window.

In various embodiments, applying the amplitude modulation of said upper and/or lower threshold current levels includes maintaining the same average current, in particular applying the same amplitude modulation to both said upper and/or lower threshold current levels.

In variant embodiments, applying an amplitude modulation of said upper and lower threshold current levels includes setting said upper and lower threshold current levels according to one of the following combinations: setting both upper and lower thresholds with the same sign, in particular to operate a converter in CCM (Continuous Conduction Mode); setting the upper and lower thresholds with discordant signs, in particular to operate to operate a converter in TCM (Triangular Current Mode); or setting one of the thresholds to zero and the other different from zero, in particular to operate a converter in TM (Transition Mode) or in DCM (Discontinuous Conduction Mode).

In various embodiments, defining the frequency modulation window around a limit frequency includes identifying the frequency at which a peak, in particular the peak with the maximum value, of the current exceeds a given EMI limit and setting it as the limit frequency.

In various embodiments, defining the frequency modulation window includes defining a single frequency modulation window or defining more than one frequency modulation window, identifying correspondingly more than one limit frequency and more than one allowable EMI limit curve.

In various embodiments, said method includes operating said converter according to a PFC TCM control in which said upper and lower threshold current levels correspond to a peak reference current and a reverse current and applying an amplitude modulation includes setting the amplitude, shape and rate of the modulation.

In various embodiments, applying an amplitude modulation of said upper and/or lower threshold current levels varying with time includes applying a sinusoidal modulation.

In various embodiments, only one threshold is modulated, in particular the modulation shape being periodic with a given period and the modulation duration being an integer multiple of the modulation period.

Moreover, in the present description, various embodiments regard a variable frequency converter apparatus operating with variable frequency comprising: a control module configured to apply a variable duty cycle switching signal at a switching frequency to a switching current regulation circuit arrangement energizing an energy storage circuit assembly, in particular an inductor; wherein applying the variable duty cycle switching signal includes defining an upper threshold current level and a lower threshold current level at the reaching of which a switch is performed so that said switching frequency is proportional to an inverse of a difference between said upper and lower threshold current level, said upper and lower threshold current levels varying with time following an average current value time variation; introducing a frequency jitter in the variable duty cycle switching signal; defining a frequency modulation window around a limit frequency identifying a limit value for the accepted EMI; said module configured to apply an amplitude modulation of said upper and/or lower threshold current levels varying with time, said amplitude modulation being applied in a time interval between times when the switching frequency enters and exit said frequency window.

In variant embodiments, said control module comprises a module for controlling the jitter of the switching frequency receiving said switching frequency and generating said amplitude modulation in a time interval between times when the switching frequency enters and exit said frequency window and further circuitry to apply the modulation to said upper and/or lower threshold current levels.

In variant embodiments, said module for controlling the jitter of the switching frequency also receives a set of parameters including the inductor current, the input voltage, the output voltage, the output current and EMI limit value, or a subset or combination or a function or a relation of such set of parameters and/or further electrical or physical parameters suitable to define the thresholds modulation.

In variant embodiments, said control module is configured to operate according to a PFC CCM (Continuous Conduction Mode) control.

In variant embodiments, said control module is configured to operate according to a PFC TCM (Triangular Current Mode) control.

In variant embodiments, said module is configured to operate according to a PFC Transition Mode or DCM mode control.

In variant embodiments, said converter is configured according to a topology selected among: AC/DC converter topology; DC/AC converter topology; AC/AC converter topology; and DC/DC converter topology.

In variant embodiments, said converter may be configured according to a topology selected among one of the following: AC/DC, DC/AC or AC/AC topologies (for example of the type: single-phase or three-phase or n-phase, isolated converter or not isolated converter, interleaved or not, in particular boost/buck/buck-boost/sepic PFC, Vienna rectifier PFC, bidirectional PFC, VSI, CSI 2/n-levels, frequency converters, cycloconverters, matrix converters); DC/DC converters topologies (for example of the type: bidirectional converter or not bidirectional, which are isolated or not, interleaved or not, in particular flyback/forward/push-pull, half/full bridge topologies.

BRIEF DESCRIPTION OF THE DRAWINGS

The embodiments of the present disclosure will now be described with reference to the annexed drawings, which are provided purely by a way of non-limiting example and in which.

DETAILED DESCRIPTION

In the ensuing description various specific details are illustrated aimed at enabling an in-depth understanding of the embodiments. The embodiments may be provided without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of this description is intended to indicate that a particular configuration, structure, or characteristic described in relation to the embodiment is comprised in at least one embodiment. Hence, phrases such as "in an embodiment", "in one embodiment", and the like that may be present in various points of this description do not necessarily refer to one and the same embodiment. Moreover, particular conformations, structures, or characteristics may be combined in an adequate way in one or more embodiments.

The references used herein are provided only for convenience and hence do not define the sphere of protection or the scope of the embodiments.

The solution described herein regards a method which exploits control systems of variable frequency switching converters where two thresholds (high and low or upper and lower) are used to control converter switching, the switching frequency being proportional to the inverse of a difference between the thresholds. The solution may provide modulating in time of the threshold levels in order to attenuate some particular frequency in the signal spectrum. The method may provide modulating one or both of the high and low thresholds.

In particular, in the case of current controlled converters, for a given frequency, out of a given EMI limit, indicated as $f_{sw,OUT}$, a frequency modulation window $f_{sw,OUT} \pm \Delta f$ is chosen, e.g., a frequency window with an amplitude of $2*\Delta f$ around the given EMI limit $f_{sw,OUT} \pm \Delta f$. When the value of the actual switching frequency $f_{sw}$ falls inside the set window $f_{sw,OUT} \pm \Delta$ the modulation of the thresholds is activated.

Preferably, both thresholds are modulated in order to maintain the same average current and do not affect other control sections, such as the voltage loop, etc. The value of the main threshold modulation parameters, which may belong to a set comprising modulation shape, modulation amplitude and modulation rate or frequency, can be chosen on the basis of the frequency of the EMI peak, current level and other converter constraints. Several different combinations of the threshold modulation parameters are possible, in order to obtain the best result without worsening the control stability and the converter performances.

Figure 1:
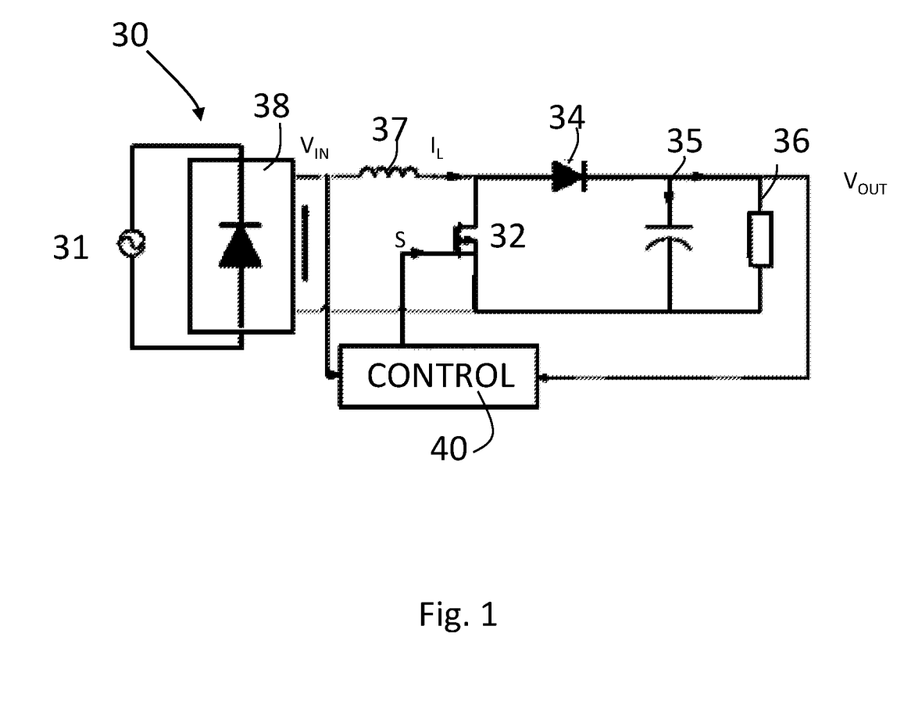
FIG. 1 is a schematic illustration of a circuit arrangement according to the present description.

FIG. 1 shows a PFC power converter 30 in which an AC voltage source 31 supplies an alternating current (AC) input voltage V through a rectifier 38 to a boost inductor 37. A switch 32 is provided downstream of the inductor 37, according to the known boost converter configuration, coupling the inductor 37 either to the ground or to a diode 34. Between the output node of the diode 34 and ground an output capacitor 35 and a load 36 are coupled in parallel.

A switching signal S drives the switch 32 in on and off states with a variable duty cycle, e.g. a PWM signal is used, so that the inductor current $I_L$ increases linearly during the on phase and decreases linearly during the off phase, i.e. it is a triangular waveform where the respective slopes of the inductor current $I_L$ increase and decrease are determined by the ratio of the rectified voltage $V_{IN}$ to the inductor 37 value and the ratio of the difference of rectified voltage $V_{IN}$ with respect the output voltage $V_{OUT}$ ($V_{IN} - V_{OUT}$) to the inductor 37 value. The switching signal S is generated by a control module 40 which receives as input the rectified input voltage $V_{IN}$ and the output voltage $V_{OUT}$ to perform a control with hysteresis as described in the following with reference to FIG. 2.

Figure 2:
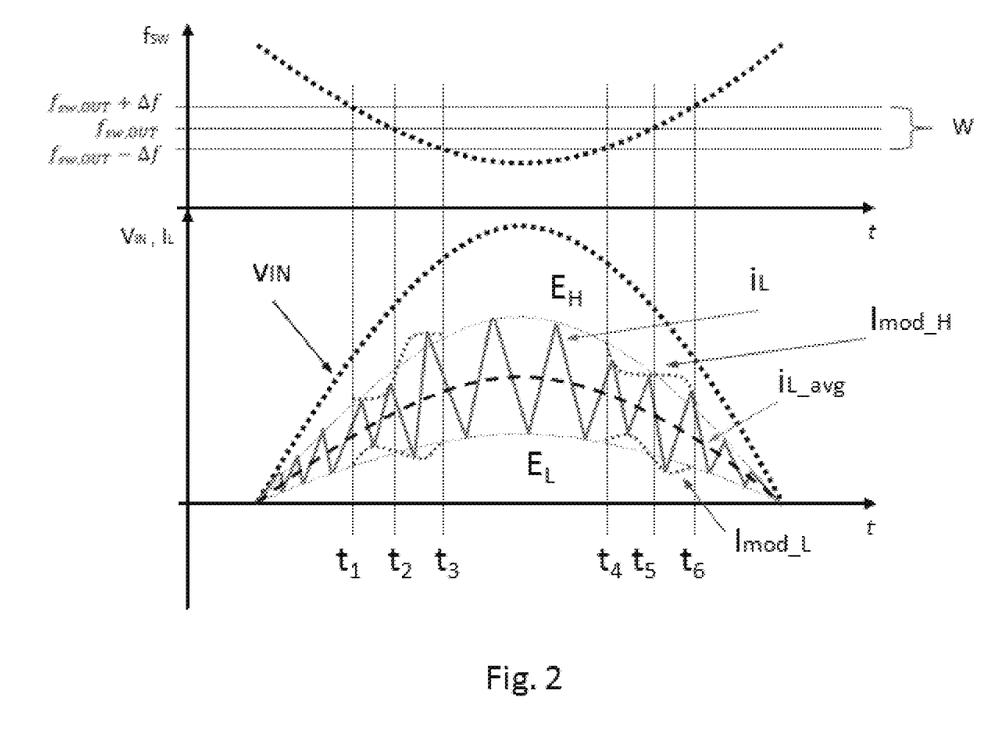
FIG. 2 shows a diagram of quantities used by an embodiment of a circuit arrangement according to the present description.

FIG. 2 shows a diagram representative of quantities of a PFC CCM power conversion. In particular, FIG. 2 is a diagram showing the switching frequency $f_{sw}$ of the switching signal S in an upper part and the inductor current $I_L$ in a lower part, which is in general the current which is controlled to perform the switching, and input voltage value $V_{IN}$ for a PFC CCM converter, both as a function of time t.

An EMI limit frequency $f_{sw,OUT}$ is shown in the upper part of the diagram as a constant value as a function of time t. The EMI limit frequency preferably is a frequency at which there is big peak in the inductor current $I_L$, possibly a peak exceeding a given EMI limit, e.g. a class A—QP limit, in particular the peak of the $I_L$ with the maximum amplitude. The modulation frequency window W is defined as a range of frequencies around said EMI frequency limit $f_{sw,OUT}$ with a frequency amplitude $2*\Delta f$, i.e., the modulation frequency window has a bandwidth $f_{sw,OUT} \pm \Delta f$.

The input voltage $V_{IN}$ increases and decreases in a sinusoidal arc, while the inductor current $I_L$, as explained, is a triangular waveform at the switching frequency $f_{sw}$, oscillating around an average value curve $i_{L\_avg}$, which has the same monotony of the input voltage $V_{IN}$. The control module 40 is configured, according to the control with hysteresis, to maintain the peaks of the sawtooth waveform of the inductor current $I_L$ between an upper and a lower reference curve or envelope $E_H$, $E_L$.

As can be seen, the switching frequency $f_{sw}$ varies with the variation of the input voltage $V_{IN}$, in particular decreases with the input voltage $V_{IN}$ increase. Thus, when the switching frequency $f_{sw}$ enters the modulation window W at a time $t_1$, i.e., goes below the upper threshold $f_{sw,OUT} + \Delta f$, a high threshold modulation Imod_H of the upper envelope $E_H$ and a low threshold modulation Imod_L of the lower envelope $E_L$ are performed. Thus, around the EMI limit $f_{sw,OUT}$ curve, which is reached at time $t_2$ the peaks of the inductor current $I_L$ are modulated with a modulation of a settable frequency and amplitude. Also the shape of the modulation can be chosen.

When the switching frequency $f_{sw}$, still decreasing, crosses at time $t_3$ the lower threshold $f_{sw,OUT} - \Delta f$ exiting the modulation window W, the high and low threshold modulation Imod_H, Imod_L are stopped.

When then the switching frequency $f_{sw}$ increases again, crossing the modulation window W at time $t_4$ (entering the window) and $t_6$ (exiting the window) again a high threshold modulation Imod_H of the upper envelope $E_H$ and a low threshold modulation Imod_L of the lower envelope $E_L$ are performed.

Figure 3:
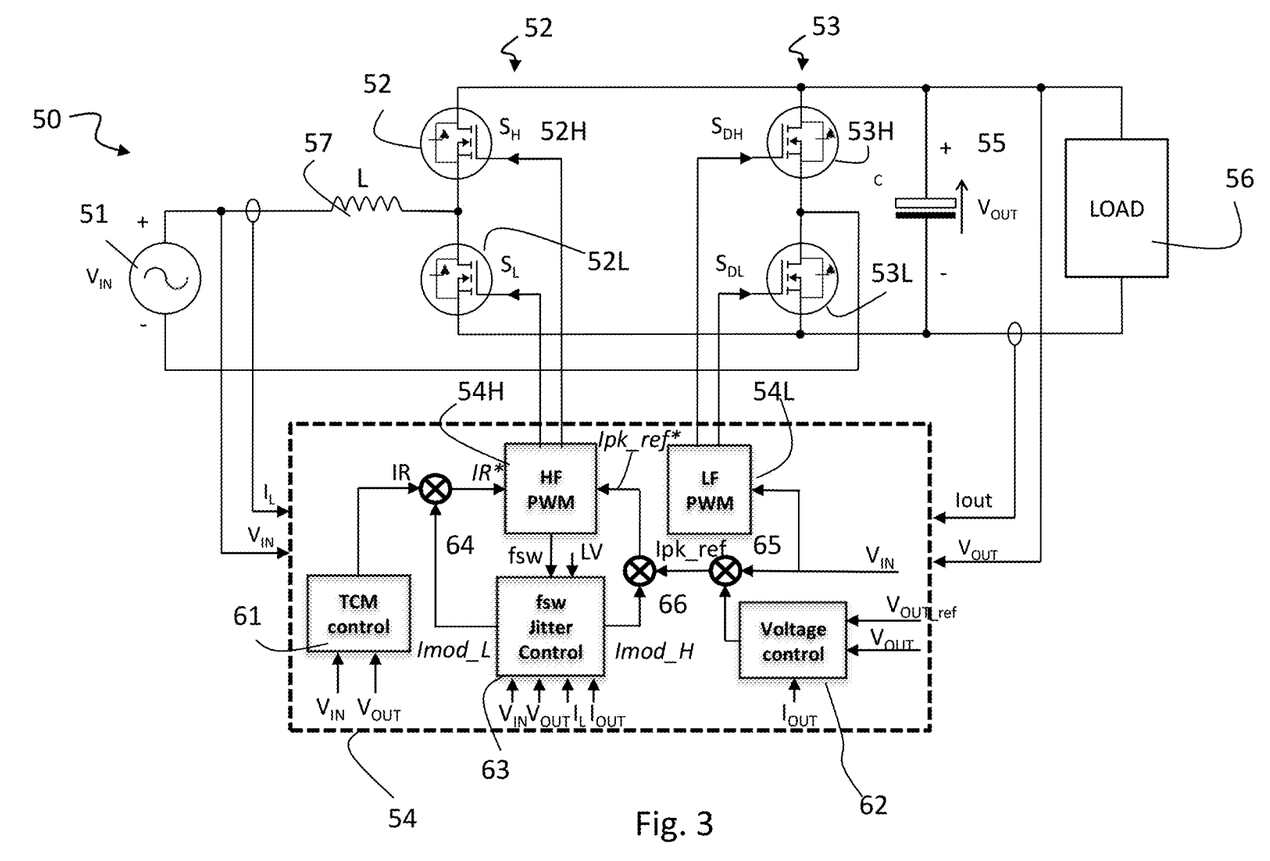
FIG. 3 shows a further circuit arrangement according to the present description.

FIG. 3 shows an embodiment 50 of a variable frequency converter which is a PFC bridgeless totem pole circuit with TCM control, which comprises a high-frequency half-bridge 52 and a low frequency, in particular, line-frequency, half-bridge 53, each comprising a respective high side switch 52H, 53H and low side switch 52L, 53L.

An alternating current (AC) voltage source 51 supplies an alternating current voltage $V_{IN}$ through a boost inductor 57 to the common node, i.e. the node in common between the high side and low side switch, of the high frequency half bridge 52, the half-bridge 53 being connected in parallel with respect to half bridge 52, and its common node being coupled to the other terminal of the voltage source 51.

The switching converter apparatus 50 comprises a converter control module 54 including a high frequency module 54H which supplies high frequency driving complementary PWM signals $S_H$, $S_L$ for the switches 52H, 52L of the high-frequency half-bridge 52. A low frequency module 54L supplies the low frequency driving complementary PWM signals SDH, SDL for the switches 53H, 53L of the low frequency half bridge 53.

A bulk capacitor 55 is placed in parallel with the half-bridges 52 and 53 and in parallel to a load 56, an output voltage $V_{OUT}$ being taken at the nodes representing the terminals of the bulk capacitor 55.

Operation of the PFC bridgeless totem pole circuit provides that the high frequency half bridge 52 is driven by high frequency signals $S_H$, $S_L$ to implement the Power Factor Correction. In an embodiment, alternatively switch 52L is the active switch, while switch 52H acts as the synchronous rectifier switch, or switch 52H is the active switch, while switch 52L is the synchronous rectifier switch.

For what regards the low frequency half bridge 53, during the positive half line cycle, switch 53L is reversely conducting the AC power current since the neutral point is coupled to the negative terminal of the DC side. During the negative half line cycle, switch 53H is reversely conducting the current by coupling the AC neutral point to the positive terminal of the DC side.

Figure 4:
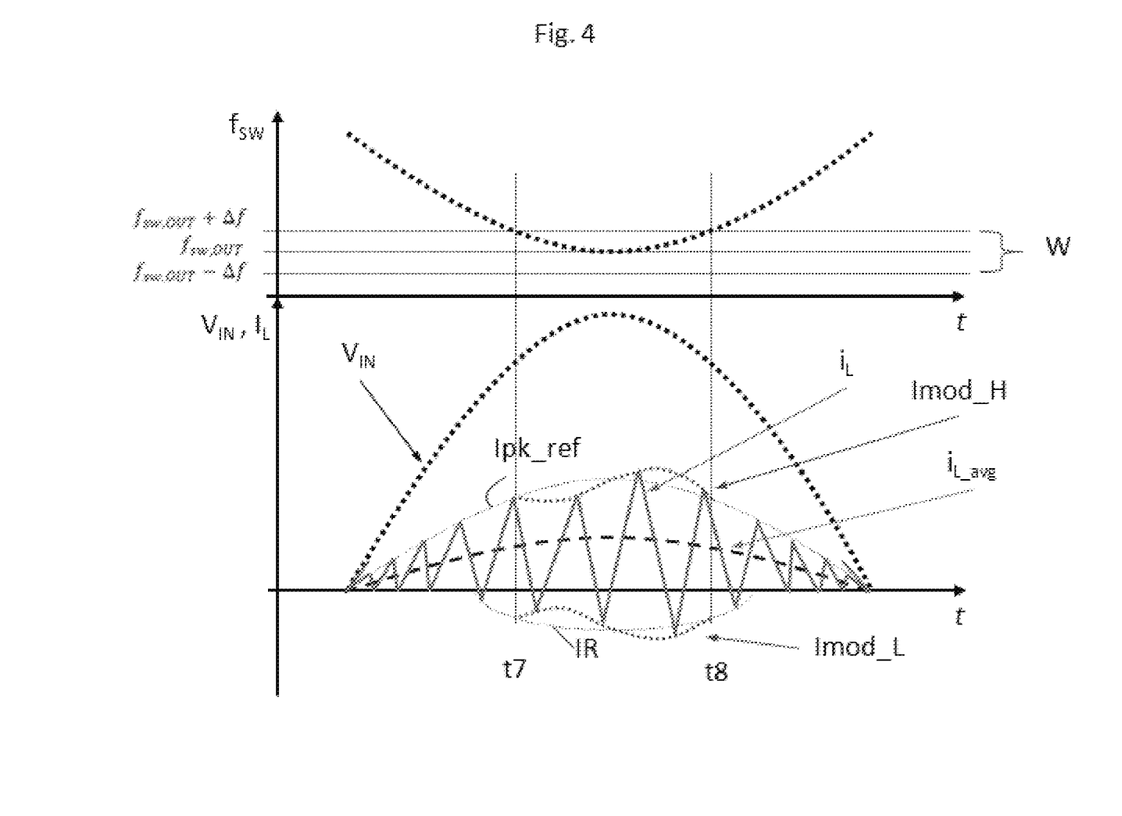
FIG. 4 shows a diagram of quantities used by an embodiment of a circuit arrangement according to the present description.

As can be seen in the diagram of FIG. 4, when the input voltage $V_{IN}$ is lower than half of the output voltage $V_{OUT}$, the control 54 operates the converter in CRM (the switching rectifier 52H is turned off when $I_L = 0$) while when the input voltage $V_{IN}$ is higher than half of the output voltage $V_{OUT}$, the converter operates in TCM mode. In TCM mode, the SR switch 52H is turned off when the inductor current $I_L$ goes down across zero and to the required reverse current IR.

In TCM mode, the required reverse current IR increases with the increasing of input signal $V_{IN}$. Reverse current IR can be calculated by the sensed signals, input voltage $V_{IN}$ and output voltage $V_{OUT}$, and the parameters of the circuit like the boost inductor 57 inductance value and the capacitances of the switches.

The converter 50 can be driven thus as depicted in FIG. 4, between an upper and a lower reference curve represented respectively by the reverse current reference IR and the peak reference Ipk_ref.

In the converter control module 54, a TCM module control 61 receives the input voltage $V_{IN}$ and the output voltage $V_{OUT}$ and generates a reverse current reference IR, supplied as a control quantity, i.e. lower reference curve, to the high frequency module 54H. A voltage control module 62 receives the output voltage $V_{OUT}$ and a reference output voltage value $V_{OUT\_ref}$, and the output current $I_{OUT}$, to perform a control, e.g., proportional integral, which ensures that the output voltage $V_{OUT}$ follows the reference-constant voltage output $V_{OUT\_ref}$. The output signal of the voltage control module 62 is combined in a multiplier 65 with the input voltage $V_{IN}$ to obtain the peak reference current $I_{pk\_ref}$.

According to the solution here described the converter control module 54 further includes a module for the control of the jitter of the switching frequency 63 receiving the switching frequency $f_{sw}$ from the high frequency module 54H and supplying a high modulation current Imod_H and a low modulation current Imod_L.

The module for the control of the jitter of the switching frequency 63 receives also the inductor current IL, the input voltage $V_{IN}$, the output voltage $V_{OUT}$, output current $I_{OUT}$ and EMI limit value LV, as shown in FIG. 3.

Thus, the module for the control of the jitter of the switching frequency 63 receives at least such switching frequency $f_{sw}$ and generates the amplitude modulation Imod_H, Imod_L in a time interval between times when the switching frequency enters and exits the frequency window W. In variant embodiments it may receive also the inductor current IL, the input voltage VIN, the output voltage $V_{OUT}$, output current $I_{OUT}$ and EMI limit value LV. In variant embodiments the module for the control of the jitter of the switching frequency 63 may receive a subset or combination or a function or a relation of such set of parameters including the switching frequency $f_{sw}$, the inductor current IL, the input voltage $V_{IN}$, the output voltage $V_{OUT}$, output current $I_{OUT}$ and EMI limit value LV. In variant embodiments the module for the control of the jitter of the switching frequency 63 may receive in addition to one of the set of parameters indicated above, any other electrical or physical parameter (calculated or measured) that is useful to define the thresholds modulation.

The high modulation current Imod_H is combined with the peak reference current Ipk_ref, in particular in a signal modulator 66, to obtain a modulated peak reference current Ipk_ref* supplied as upper reference curve to the high frequency module 54H, while the low modulation current Imod_L is mixed, in particular in a signal modulator 64, with the reverse current reference IR obtaining a modulated reverse current reference IR*, supplied as lower reference curve to the high frequency module 54H in order to drive the switching of the PWM signals SH, SL, as shown in the diagram of FIG. 4.

In FIG. 4, describing the PFC bridgeless totem pole with TCM control, the diagram as a function of time is similar to the one of FIG. 2, only the lower envelope $E_L$ is substituted by a reverse current reference value IR, while the upper envelope $E_H$ is represented by a peak current, reference value Ipk_ref. In this case the current $I_L$ enters at a time $t_7$ the modulation window W and exits at time $t_8$, reaching the EMI limit frequency $f_{sw,OUT}$ without crossing it. The low threshold modulation Imod_L is applied to reference reverse current IR and the high threshold modulation Imod_H to the peak current reference value Ipk_ref.

Thus, the high frequency module 54H implements a current control loop which switches when the peak of the inductor current $I_L$ reaches one of the reference curves represented by the modulated reference reverse current IR* and modulated peak current reference value Ipk_ref*.

Thus, the method here described to control a variable frequency converter apparatus, e.g. CCM apparatus 30, which can be also DCM or TM, or TCM apparatus 50, operating with variable frequency comprises: applying a variable duty cycle switching signal like signal S or signals $S_H$, $S_L$ at a switching frequency $f_{sw}$ to a switching current regulation circuit arrangement, e.g. switch 32 or half-bridge 52, energizing a current storage circuit assembly, which is usually an inductor 37 or 57; such applying a variable duty cycle switching signal including defining an upper and a lower threshold current level, which in case of CCM are envelopes $E_H$, $E_L$, while for TCM are currents $I_R$, $I_{pk\_ref}$ at the reaching of which performing the switch, so that such switching frequency $f_{sw}$ is proportional to the inverse of distance between said upper and lower threshold current level, said upper and lower threshold current level varying with time following an average current $I_{L\_avg}$ value time variation.

As mentioned, maintaining the same average current $I_{L\_avg}$ may require, in particular, applying the same amplitude modulation Imod_H, Imod_L to both said upper and/or lower threshold current levels $E_H$, $E_L$ or $I_R$, $I_{pk\_ref}$. In order to maintain the same instantaneous average current the modulation behavior in time of modulations Imod_H and Imod_L have to be equal in value but monotonically opposite (e.g., if modulation Imod_H increase of 1A Imod_L must decrease of 1A and vice versa) or out of phase of 180 degrees in case of periodic shape modulation as shown in FIG. 2 and FIG. 4. Also, in variant embodiments it is possible to modulate only one threshold, although the instantaneous average current is perturbed together with the control system and the energy balance may be altered. The latter can be solved if the modulation shape is periodic, e.g., of period T and the modulation duration, e.g., D, is an integer multiple of the modulation period D=KT where K is an integer number.

It is here underlined that both current thresholds can be positive, negative or zero or a combination of these three possibilities. The combination of these thresholds may define the operation mode of the converter or selected in connection to the operation mode of the converter. For example:
 if both upper and lower thresholds have the same sign (positive or negative) the operation of the apparatus may be CCM (Continuous Conduction Mode);
 if the upper and lower thresholds have discordant signs the operations of the apparatus may be in TCM (Triangular Current Mode);
 if one of the thresholds is zero and the other is different from zero the operations of the apparatus may be in TM (Transition Mode) or in DCM (Discontinuous Conduction Mode).

The solution, in order to reduce EMI, includes introducing a frequency jitter in the variable duty cycle switching signal S or $S_H$, $S_L$, defining at least a frequency modulation window W around a limit frequency $f_{sw,OUT}$ identifying a limit value LV (as indicated below in FIG. 7) for the accepted EMI; applying an amplitude modulation, high Imod_H or low Imod_L of said upper and/or lower threshold current levels varying with time, such amplitude modulation being applied in a time interval, e.g. intervals $t_1$-$t_3$ and $t_4$-$t_6$ in FIG. 2 and $t_7$-$t_8$ in FIG. 4, between times when the switching frequency enters and exit said frequency window W.

It is underlined defining at least a frequency modulation window may be implemented by defining a single frequency modulation window or otherwise it is possible to define more than one modulation window, identifying correspondingly more than one limit frequency and more than one allowable EMI limit curve.

Converter apparatuses 30 and 50 are AC-DC regulators which usually followed by a DC-DC conversion stage, i.e. the load is coupled to the output of apparatuses 30 and 50 through such DC-DC conversion stage.

The proposed solution has been tested in MATLAB/Simulink simulation environment.

Figure 5:
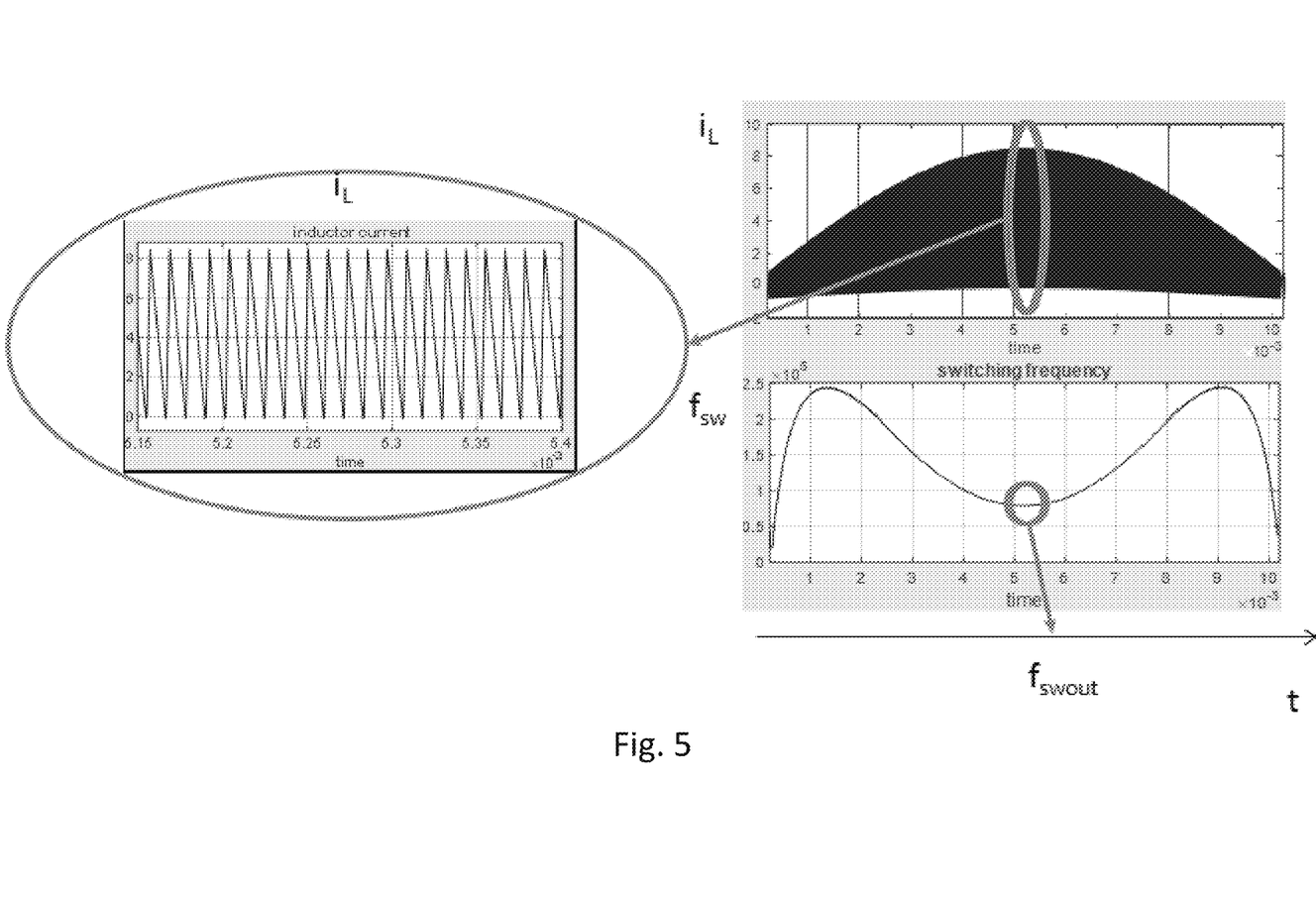
FIG. 5, 6, 7A, 7B show diagrams representing results of a simulation of a circuit arrangement according to the present description.

The simulation has been performed, according to the previous application example of PFC bridgeless totem pole with TCM control, with the goal of EMI peaks reduction. The following converter parameters have been used:

Input voltage $V_{IN}$=230Vac
Output voltage $V_{OUT}$=400Vdc
Output power $P_{OUT}$=680 W
Boost inductor value L=80 µH (EQ38/8/25-3C95, PN: 2402.001 Magnetica)
HF switch 52H, 52L=STH36N60DM6-7TAG
LF switch 53H, 53L=STH47N60DM6-7TAG FIG. 5 shows inductor current $I_L$ and switching frequency $f_{sw}$ as a function of time t, and it is shown that the peak of inductor current waveform $I_L$ is 9A at 80 kHz, so this is identified as the reference frequency for modulation setting, i.e. the EMI limit $f_{sw,OUT}$ It is magnified the region around the EMI limit frequency $f_{sw,OUT}$ at 80 KHz.

Figure 6:
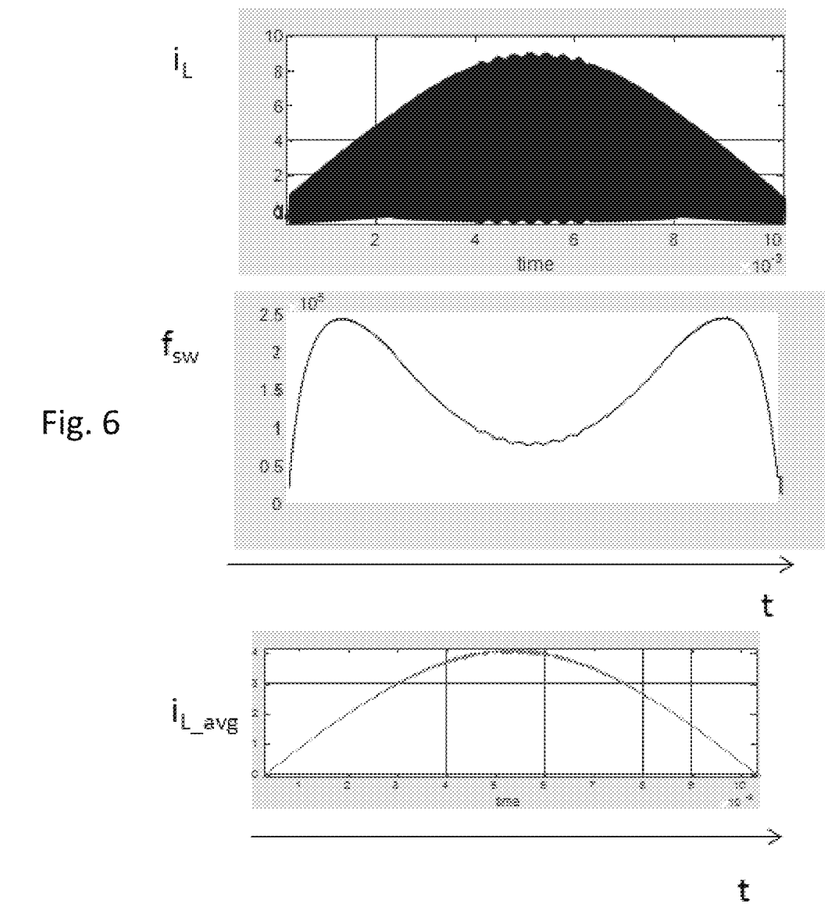

As shown in FIG. 6, which also shows the average inductor current $I_{L\_avg}$ as a function of time t, the modulation parameters are:

frequency modulation window W=60-100 kHz ($f_{sw,OUT}$ 80 KHZ, Δf=±20 kHz);
amplitude of high modulation current Imod_H and a low modulation current Imod_L=20% of actual reverse current IR;
rate of high modulation current Imod_H and a low modulation current Imod_L=3 kHz.

It can be observed that the average current is still sinusoidal, so the modulation does not affect the control system from energetic point of view.

Figure 7A:
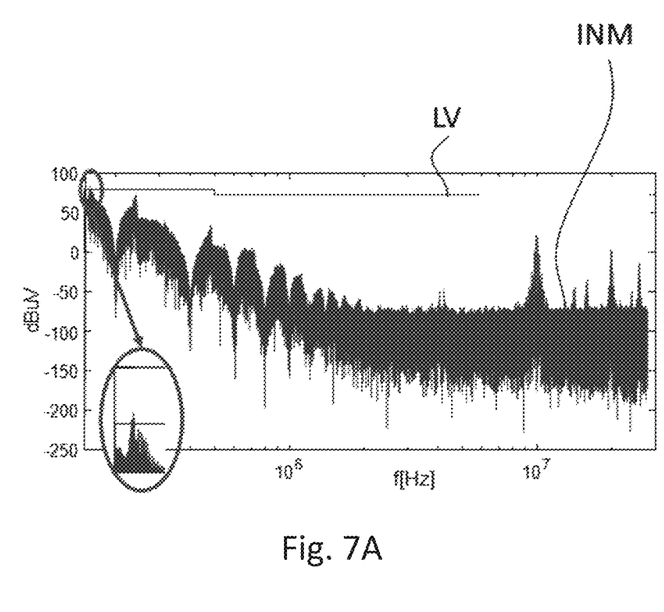
Figure 7B:
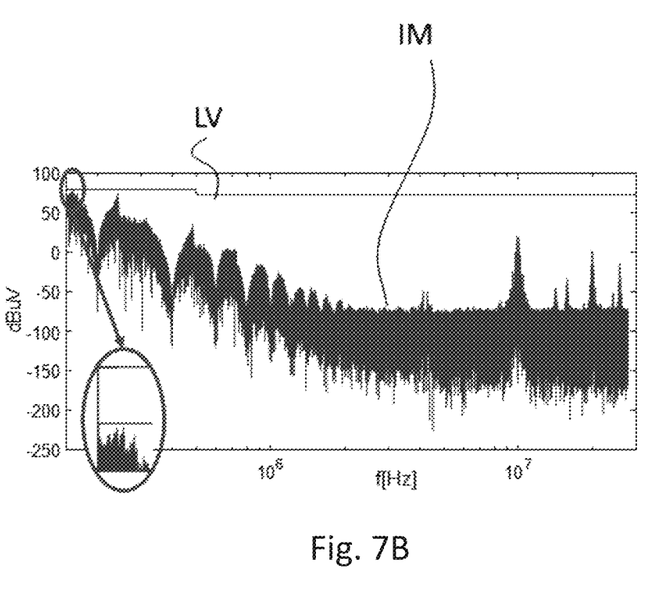

In FIGS. 7B and 7A are shown two spectra of the inductor current $I_L$ respectively with (IM) and without (INM) modulation.

It is magnified the region around the second harmonic (at 160 kHz) of EMI limit frequency $f_{sw,OUT}$ at which a peak exceeding the EMI limit is present.

Before the modulation a EMI peak of 83 dBµV is present, in this case above the class A—QP limit of 79 dBµV indicated by the line LV.

After modulation the EMI peak is 77 dBµV, so below the EMI limit LV.

In general defining a frequency modulation window W around a limit frequency $f_{sw,OUT}$ includes identifying the frequency at which a peak of the inductor current, in particular the peak with the maximum amplitude among the inductor current peaks, exceeds a given EMI limit LV and setting it as limit frequency $f_{sw,OUT}$.

In the Table 1 below are shown the simulation results

TABLE 1

| $V_{IN}$ [Vac] | Pout [W] | EMI limit 150 kHz-500 kHz [dBµV] | EMI limit 500 kHz-30 MHz [dBµV] | EMI filter fc [kHz] | TCM without modulation | | TCM with modulation | |
|---|---|---|---|---|---|---|---|---|
| | | | | | EMI pk value [dBµV] | EMI Pk freq. [kHz] | EMI pk value [dBµV] | EMI pk freq. [kHz] |
| 230 | 680 | 79 | 73 | 200 | 83 | 160 | 77 | 160 |

Thanks to the modulation the EMI peak is reduced below the limit without modifying the EMI filter.

The solution described herein enables to perform a flexible frequency jitter in a variable frequency converter without adding external circuits and with no perturbation in the control unit. Depending on the particular case, it is also possible to avoid EMI filter tuning or reduce the number/size of passive filter components.

This is obtained thanks to applying a modulation on the current levels in order to control and/or modify and/or adjust the converter switching frequency.

Of course, without prejudice to the principle of the invention, the details of construction and the embodiments may vary widely with respect to what has been described and illustrated herein purely by way of example, without thereby departing from the scope of the present invention, as defined by the ensuing claims.

The solution here described can be extended to all power converters with current threshold control.

Different criteria can be applied to select the modulation amplitude, rate and shape of the amplitude modulation. In the exemplary embodiments a sinusoidal shape may be used since it is a periodic modulation, thus may solve energy balance problem in case of single threshold modulation, as discussed previously, and it is easy to implement. In general, any rule or function or algorithm to define the amplitude modulation must consider all the parameters that can affect the spectrum.

The claimed solution can be applied to all converter topologies, not only PFC topologies, where it is possible to implement the current threshold control. Such topologies may include one of:

AC/DC converter
DC/AC converter
AC/AC converter
DC/DC converter.

In variant embodiments, said converter may be configured according to a topology selected among one of the following:

AC/DC, DC/AC or AC/AC topologies of the type:
single-phase or three-phase or n-phase, isolated converter or not isolated converter, interleaved or not, in particular boost/buck/buck-boost/sepic PFC, Vienna rectifier PFC, bidirectional PFC, VSI, CSI 2/n-levels, frequency converters, cycloconverters, matrix converters, DC/DC converters topologies of the type:
bidirectional converter or not bidirectional, which are isolated or not, interleaved or not, in particular flyback/forward/push-pull, half/full bridge topologies.

In variant embodiments, such converter may be configured according to any variant of the topologies listed in the paragraph above to which the claimed solution applies.

The claims form an integral part of the technical teaching of the description provided herein.

The invention claimed is:

1. A method to control a converter apparatus operating with variable frequency, comprising:
applying a variable duty cycle switching signal at a switching frequency to a switching current regulation circuit arrangement energizing an inductor with an inductor current, wherein applying includes defining an upper inductor current threshold level and a lower inductor current threshold level for the inductor current to control switching by the switching current regulation circuit so that said switching frequency is proportional to an inverse of a difference between said upper and lower inductor current threshold levels, said upper and lower inductor current threshold levels varying with time following an average inductor current value time variation;
introducing a frequency jitter in the variable duty cycle switching signal;
defining at least a frequency modulation window around a limit frequency identifying a limit value for acceptable electromagnetic interference (EMI); and
applying an amplitude modulation to said upper and/or lower inductor current threshold levels varying with time, said amplitude modulation being applied within a time interval between times when a variation in the switching frequency enters and exits said frequency modulation window.

2. The method according to claim 1, wherein applying the amplitude modulation includes applying a same amplitude modulation to both said upper and lower inductor current threshold levels so as to maintain a same average current.

3. The method according to claim 2, wherein applying the same amplitude modulation includes setting said upper and lower inductor current threshold levels according to one of the following combinations:
setting both upper and lower inductor current threshold levels with a same sign to operate the variable frequency converter apparatus in Continuous Conduction Mode (CCM);
setting the upper and lower inductor current threshold levels with discordant signs to operate the variable frequency converter apparatus in Triangular Current Mode (TCM);
setting one of the upper and lower inductor current threshold levels to zero and setting the other of the upper and lower inductor current threshold levels to different from zero to operate the variable frequency converter apparatus in one of Transition Mode (TM) or Discontinuous Conduction Mode (DCM).

4. The method according to claim 1, wherein defining at least the frequency modulation window around the limit frequency includes identifying a frequency at which a peak of the inductor current exceeds a given EMI limit value and setting the identified frequency as the limit frequency.

5. The method according to claim 4, wherein defining at least the frequency modulation window comprises defining a single frequency modulation window with one limit frequency and one allowable EMI limit value.

6. The method according to claim 4, wherein defining at least the frequency modulation window comprises defining more than one modulation window and identifying one limit frequency and one allowable EMI limit value for each modulation window.

7. The method according to claim 1, wherein said variable frequency converter apparatus operates according to a Power Factor Correction with Triangular Current Mode control in which said upper and lower inductor current threshold levels correspond to a peak reference current and a reverse current and wherein applying the amplitude modulation includes setting an amplitude of the modulation at a percentage of said reverse current.

8. The method according to claim 1, wherein applying the amplitude modulation of said upper and/or lower inductor current threshold levels includes applying a sinusoidal modulation.

9. The method according to claim 1, wherein only one of the upper and lower inductor current threshold levels is modulated, and wherein a modulation shape is periodic with a given period and wherein a modulation duration is an integer multiple of the given period.

10. A converter apparatus operating with variable frequency, comprising:
a control module configured to apply a variable duty cycle switching signal at a switching frequency to a switching current regulation circuit energizing an inductor with an inductor current;
wherein switching by said switching current regulation circuit is controlled by an upper inductor current threshold level and a lower inductor current threshold level so that said switching frequency is proportional to an inverse of a difference between said upper and lower inductor current threshold levels, said upper and lower inductor current threshold levels varying with time following an average current value time variation;
said control module further configured to:
introduce a frequency jitter in the variable duty cycle switching signal;
wherein a frequency modulation window is defined around a limit frequency identifying a limit value for an acceptable electromagnetic interference (EMI); and
apply an amplitude modulation of said upper and/or lower inductor current threshold levels varying with time, said amplitude modulation being applied in a time interval between times when a variation in the switching frequency enters and exits said frequency modulation window.

11. The converter apparatus according to claim 10, wherein said control module is further configured to control the frequency jitter of the switching frequency and generate said amplitude modulation in said time interval between times when the variation in the switching frequency enters and exits said frequency modulation window and apply the amplitude modulation to said upper and/or lower inductor current threshold levels.

12. The converter apparatus according to claim 11, wherein said control module further receives a set of parameters including said inductor current, an input voltage, an output voltage, an output current and the EMI limit value.

13. The converter apparatus according to claim 11, wherein said control module further receives a subset or combination or a function or a relation of a set of parameters including said inductor current, an input voltage, an output voltage, an output current and the EMI limit value.

14. The converter apparatus according to claim 11, wherein said control module further receives a set of parameters and/or further electrical or physical parameters suitable to define the amplitude modulation of said upper and/or lower inductor current threshold levels.

15. The converter apparatus according to claim 10, wherein said control module is configured to operate according to a Power Factor Correction with Continuous Conduction Mode (CCM) mode control.

16. The converter apparatus according to claim 10, wherein said control module is configured to operate according to a Power Factor Correction with Triangular Current Mode (TCM) control.

17. The converter apparatus according to claim 10, wherein said control module is configured to operate according to a Power Factor Correction with one of Transition Mode (TM) or Discontinuous Conduction Mode (DCM) control.

18. The converter apparatus according to claim 10, wherein said converter apparatus is configured according to a topology selected among:
- an AC/DC converter topology;
- a DC/AC converter topology;
- an AC/AC converter topology; and
- a DC/DC converter topology.

19. The converter apparatus according to claim 10, wherein said control module is further configured to define at least the frequency modulation window around the limit frequency by identifying a frequency at which a peak of the inductor current exceeds a given EMI limit value and setting the identified frequency as the limit frequency.

20. The converter apparatus according to claim 19, wherein the frequency modulation window is defined by a single frequency modulation window with one limit frequency and one allowable EMI limit value.

21. The converter apparatus according to claim 19, wherein the frequency modulation window is defined by more than one frequency modulation window and each frequency modulation window has one limit frequency and one allowable EMI limit value.

\* \* \* \* \*